(12) United States Patent
Tsai

(10) Patent No.: US 11,743,937 B2
(45) Date of Patent: Aug. 29, 2023

(54) CHANNEL OCCUPANCY STRUCTURE INDICATION IN THE TIME DOMAIN

(71) Applicant: MediaTek Inc., Hsinchu (TW)

(72) Inventor: Cheng-Rung Tsai, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 384 days.

(21) Appl. No.: 17/023,854

(22) Filed: Sep. 17, 2020

(65) Prior Publication Data

US 2021/0120580 A1   Apr. 22, 2021

Related U.S. Application Data

(60) Provisional application No. 62/916,789, filed on Oct. 17, 2019.

(51) Int. Cl.
*H04W 4/00* (2018.01)
*H04W 74/00* (2009.01)
*H04W 72/0446* (2023.01)
*H04W 74/08* (2009.01)
*H04W 72/23* (2023.01)

(52) U.S. Cl.
CPC ..... *H04W 74/006* (2013.01); *H04W 72/0446* (2013.01); *H04W 72/23* (2023.01); *H04W 74/0808* (2013.01)

(58) Field of Classification Search
CPC ............. H04W 74/006; H04W 72/042; H04W 72/0446; H04W 74/0808
See application file for complete search history.

(56) References Cited

U.S. PATENT DOCUMENTS

| 2019/0349180 | A1* | 11/2019 | Lu | H04L 27/2607 |
| 2020/0137793 | A1* | 4/2020 | Chen | H04W 72/0446 |
| 2020/0145972 | A1* | 5/2020 | Kwak | H04W 72/23 |
| 2020/0267764 | A1* | 8/2020 | Rastegardoost | H04W 72/0446 |

OTHER PUBLICATIONS

3GPP TSG RAN WG1 #98bis, "DL signals and channels for NR-U", (R1-1910457) (Year: 2019).*
3GPP TSG RAN WG1 #98bis, "Physical layer design of DL signals and channels for NR-U", (R1-1910817) (Year: 2019).*
Samsung: "DL signals and channels for NR-U", 3GPP TSG RAN WG1 #98bis; RI-1910457; Chongqing, China; Oct. 14, 2019-Oct. 20, 2019 [retrieved on Oct. 8, 2019], section 3 and figure 1.

(Continued)

*Primary Examiner* — Siren Wei
(74) *Attorney, Agent, or Firm* — Tong J. Lee

(57) ABSTRACT

A user equipment terminal (UE) in a wireless network receives configuration information for a serving cell from a base station. The UE identifies, from the configuration information, a downlink control information (DCI) format that includes a channel occupancy duration (CO duration) field for the serving cell. After detecting the DCI format, the UE determines, from the CO duration field for the serving cell included in the DCI format, a channel occupancy in a time domain for the serving cell at a symbol-level granularity.

20 Claims, 6 Drawing Sheets

(56) References Cited

OTHER PUBLICATIONS

LG Electronics: "Physical layer design of DL signals and channels for NR-U", 3GPP TSG RAN WG1 #98bis; RI-1910817; Chongqing, China; Oct. 14, 2019- Oct. 20, 2019 [retrieved on Oct. 8, 2019], section T-domain channel occupancy indication; section Two-dimensional channel occupancy indication; and figures 1, 3.
Sony: "DL Signals and Channels for NR-U", 3GPP TSG RAN WG1 #98bis; RI-1910758; Chongqing, China; Oct. 14, 2019-Oct. 20, 2019 [retrieved on Oct. 7, 2019], section 2.1.1.
European search report, Application No. EP 20 20 1297, dated Feb. 11, 2021.

\* cited by examiner

CHANNEL OCCUPANCY STRUCTURE INDICATION IN THE TIME DOMAIN

CROSS-REFERENCE TO RELATED APPLICATIONS

This application claims the benefit of U.S. Provisional Application No. 62/916,789 filed on Oct. 17, 2019, the entirety of all of which is incorporated by reference herein.

TECHNICAL FIELD

Embodiments of the invention relate to wireless communications; more specifically, to the transmission of control information from a base station to a user equipment (UE).

BACKGROUND

The Fifth Generation New Radio (5G NR) is a telecommunication standard for mobile broadband communications. 5G NR is promulgated by the 3rd Generation Partnership Project (3GPP) to significantly improve performance metrics such as latency, reliability, throughput, etc. 5G NR supports operations in unlicensed spectrum (NR-U) to provide bandwidth to mobile users in addition to the mmWave spectrum. Some aspects of NR-U technology may be based on the 4G Long Term Evolution (LTE) standard, such as the LTE License Assisted Access (LTE-LAA).

Shared access between NR-U and Wi-Fi is regulated in many countries. Such regulations require that a radio transmitter perform a Clear Channel Assessment (CCA), such as a listen-before-talk (LBT) process, before signal transmission in the unlicensed spectrum. In addition, the regulations also impose a maximum duration on the radio transmitter's channel occupancy after LBT succeeds. Other countries that do not have such regulations also generally adopt a channel access design that enforces both LBT and the maximum channel occupancy duration to promote the coexistence of different radio air interfaces.

In the LBT process, a transmitting station listens to (e.g., senses) a subband before transmission in that subband to determine whether the subband is clear or occupied by ongoing transmission activities. A subband is a channel in the frequency domain. An LBT failure indicates that the subband is occupied. A transmitting station can start transmission in a subband when LBT succeeds for that subband, or waits/retries until LBT succeeds for that subband.

The existing 5G NR technology can be further improved to benefit operators and users of the unlicensed spectrum. These improvements may also apply to other multi-access technologies and the telecommunication standards that employ these technologies.

SUMMARY

In one embodiment, a method is performed by a user equipment (UE) in a wireless network. The method comprises: receiving configuration information for a serving cell from a base station; identifying, from the configuration information, a downlink control information (DCI) format that includes a channel occupancy duration (CO duration) field for the serving cell; and detecting the DCI format. The method further comprises: from the CO duration field for the serving cell included in the DCI format, determining a channel occupancy in a time domain for the serving cell at a symbol-level granularity.

In another embodiment, an apparatus is provided for wireless communication. The apparatus is a UE which comprises a memory and processing circuitry coupled to the memory. The processing circuitry is operative to: receive configuration information for a serving cell from a base station; identify, from the configuration information, a downlink control information (DCI) format that includes a channel occupancy duration (CO duration) field for the serving cell; and detect the DCI format. From the CO duration field for the serving cell included in the DCI format, the processing circuitry is further operative to determine a channel occupancy in a time domain for the serving cell at a symbol-level granularity.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a mechanism for providing channel occupancy indication in the time domain to UEs in a wireless network. The channel occupancy indication may be part of downlink control information (DCI) carried in a physical downlink control channel (PDCCH). The channel occupancy indication indicates the time domain validity of control information for a serving cell in a wireless network.

When an initiating device (e.g., a base station) acquires channel occupancy via LBT for transmission in a serving cell, the acquisition includes both frequency resources and time resources, such as a channel in the frequency domain and a time duration in the time domain. This time duration is referred to as the channel occupancy duration ("CO duration"). The CO duration may be communicated to the UEs in a control message (e.g., the DCI) indicating the ending time or the length of the CO duration. The reception of the DCI marks the starting time of the CO duration. The base station communicates the CO duration to the UEs to inform the UEs of the valid time for downlink reception for the serving cell. The indication of time-domain validity enables a UE to detect downlink signals only in the valid time duration. The UEs may detect the presence of a semi-statically scheduled downlink transmission in the CO duration. Furthermore, the UEs may perform uplink transmission, without LBT or with a shortened LBT, in the remaining part of the CO duration that is left unused by the base station. Thus, the success rate of uplink channel access can be increased.

The disclosed method, as well as the apparatus and the computer product implementing the method, can be applied to wireless communication between a base station (e.g., a gNB in a 5G NR network) and UEs. It is noted that while the embodiments may be described herein using terminology commonly associated with 5G or NR wireless technologies, the present disclosure can be applied to other multi-access technologies and the telecommunication standards that employ these technologies.

Figure 1:
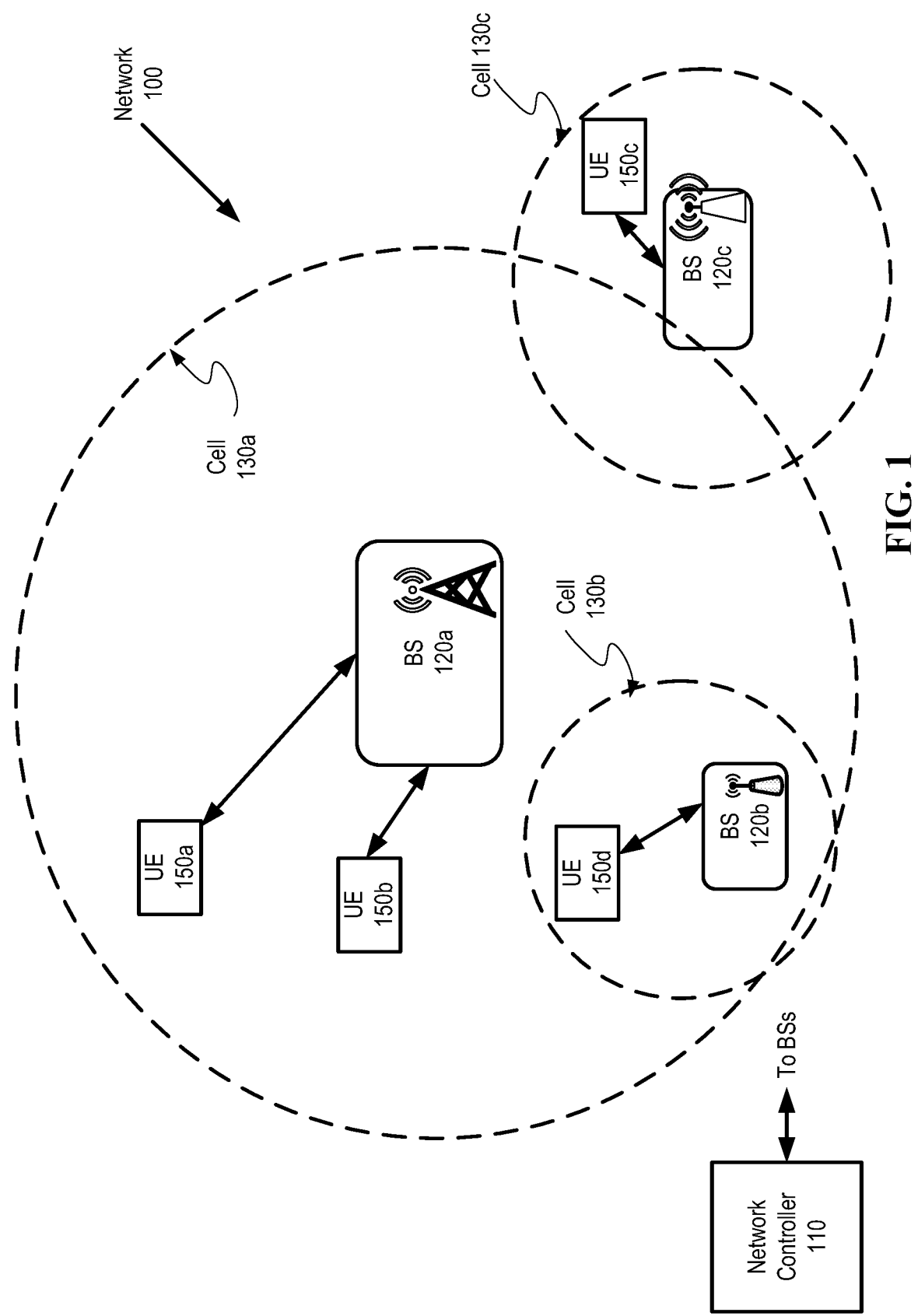
FIG. 1 is a diagram illustrating a network in which the embodiments of the present invention may be practiced.

FIG. 1 is a diagram illustrating a network 100 in which embodiments of the present invention may be practiced. The network 100 is a wireless network which may be a 5G NR network. To simplify the discussion, the methods and apparatuses are described within the context of a 5G NR network. However, one of ordinary skill in the art would understand that the methods and apparatuses described herein may be applicable to a variety of other multi-access technologies and the telecommunication standards that employ these technologies.

The number and arrangement of components shown in FIG. 1 are provided as an example. In practice, the network 100 may include additional devices, fewer devices, different devices, or differently arranged devices than those shown in FIG. 1.

Referring to FIG. 1, the network 100 may include a number of base stations (shown as BSs), such as base stations 120a, 120b, and 120c, collectively referred to as the base stations 120. In some network environments such as a 5G NR network, a base station may be known as a gNodeB, a gNB, and/or the like. In an alternative network environment, a base station may be known by other names. Each base station 120 provides communication coverage for a particular geographic area known as a cell, such as a cell 130a, 130b or 130c, collectively referred to as cells 130. The radius of a cell size may range from several kilometers to a few meters. A base station may communicate with one or more other base stations or network entities directly or indirectly via a wireless or wireline backhaul.

A network controller 110 may be coupled to a set of base stations such as the base stations 120 to coordinate, configure, and control these base stations 120. The network controller 110 may communicate with the base stations 120 via a backhaul.

The network 100 further includes a number of UEs, such as UEs 150a, 150b, 150c, and 150d, collectively referred to as the UEs 150. The UEs 150 may be anywhere in the network 100, and each UE 150 may be stationary or mobile. The UEs 150 may also be known by other names, such as a mobile station, a subscriber unit, and/or the like. Some of the UEs 150 may be implemented as part of a vehicle. Examples of the UEs 150 may include a cellular phone (e.g., a smartphone), a wireless communication device, a handheld device, a laptop computer, a cordless phone, a tablet, a gaming device, a wearable device, an entertainment device, a sensor, an infotainment device, Internet-of-Things (IoT) devices, or any device that can communicate via a wireless medium.

In one embodiment, the UEs 150 may communicate with their respective base stations 120 in their respective cells 130. A UE may have more than one serving cell; e.g., UE 150d may have both cell 130b and cell 130a as its serving cells. The transmission from a UE to a base station is called uplink transmission, and from a base station to a UE is called downlink transmission.

In one embodiment, each of the UEs 150 provides layer 3 functionalities through a radio resource control (RRC) layer, which is associated with the transfer of system information, connection control, and measurement configurations. Each of the UEs 150 further provides layer 2 functionalities through a packet data convergence protocol (PDCP) layer, a radio link control (RLC) layer, and a medium access control (MAC) layer. The PDCP layer is associated with header compression/decompression, security, and handover support. The RLC layer is associated with the transfer of packet data units (PDUs), error correction through automatic repeat request (ARQ), concatenation, segmentation, and reassembly of RLC service data units (SDUs). The MAC layer is associated with the mapping between logical channels and transport channels, multiplexing of MAC SDUs onto transport blocks (TBs), de-multiplexing of MAC SDUs from TBs, scheduling information reporting, error correction through hybrid ARQ (HARM), priority handling, and logical channel prioritization. Each of the UEs 150 further provides layer 1 functionalities through a physical (PHY) layer, which is associated with error detection on the transport channels, forward error correction (FEC) coding/decoding of the transport channels, interleaving, rate matching, mapping onto physical channels, modulation/demodulation of physical channels, and multiple-input and multiple-output (MIMO) antenna processing, etc.

In a 5G NR network, a base station such as a gNB may configure and activate a bandwidth part (BWP) for communication with UEs in a serving cell, through a radio resource control (RRC) configuration according to an RRC layer protocol. The activated BWP is referred to as the frequency resources, and the time scheduled for the communication is referred to as the time resources. The frequency resources and the time resources are herein collectively referred to as the time-and-frequency resources.

Multiple time and frequency configurations are supported by NR. With respect to time resources, a frame may be 10 milliseconds (ms) in length, and may be divided into ten subframes of 1 ms each. Each subframe may be further divided into multiple equal-length time slots (also referred to as slots), and the number of slots per subframe may be different in different configurations. Each slot may be further divided into multiple equal-length symbol durations (also referred to as symbols); e.g., 7 or 14 symbols. With respect to frequency resources, NR supports multiple different sub-carrier bandwidths. Contiguous subcarriers (also referred to as resource elements (REs)) are grouped into one resource block (RB). In one configuration, one RB contains 12 subcarriers. A channel may include multiple contiguous RBs. In one configuration, a channel is a subband for which an LBT process is performed. In the following description, the terms "subband" and "channel" are used interchangeably.

A BWP configured for a serving cell may include multiple subbands. A subband may have a bandwidth of 20 MHz or another pre-defined bandwidth. In NR-U, a base station performs an LBT process on each subband in which it intends to transmit a signal. An LBT success in a subband indicates that the subband is available for transmission and reception. An LBT failure in a subband is an indication of that subband is not available.

In one embodiment, the LBT process may include a radio transmitter detecting the energy (E) in a channel over a time duration to determine whether the channel is occupied (i.e., when E>threshold) or is clear (i.e., when E≤threshold). If the channel is occupied, the radio transmitter backs off for a time period before retransmission. If the radio transmitter successfully acquires access to the channel, it is allowed to transmit for a limited duration referred to as the maximum channel occupancy time (MCOT). To provide differentiation to different types of traffic (e.g. VoIP, video, image, data, etc.), four priority classes are defined with different LBT time limits and different MCOTs. For example, the first priority class is defined with the shortest LBT time limit and the shortest MCOT, and the fourth priority class is defined with the longest LBT time limit and the longest MCOT. The shorter the LBT, the higher the success rate for the LBT. However, a shorter LBT is associated with a shorter MCOT which means less data can be transmitted.

In a wireless network, different serving cells may be configured with different time-and-frequency resources for transmitting traffic of different priority classes. In one embodiment, a base station may acquire a CO duration for a serving cell, which may contain one or more channels. The base station may provide to the UEs an indication of channel availability to indicate whether or not each channel of a serving cell is available. The channel availability lasts until the end of CO duration. The base station also provides to the UEs with an indication of the CO duration for the available channels in the serving cell.

Figure 2:
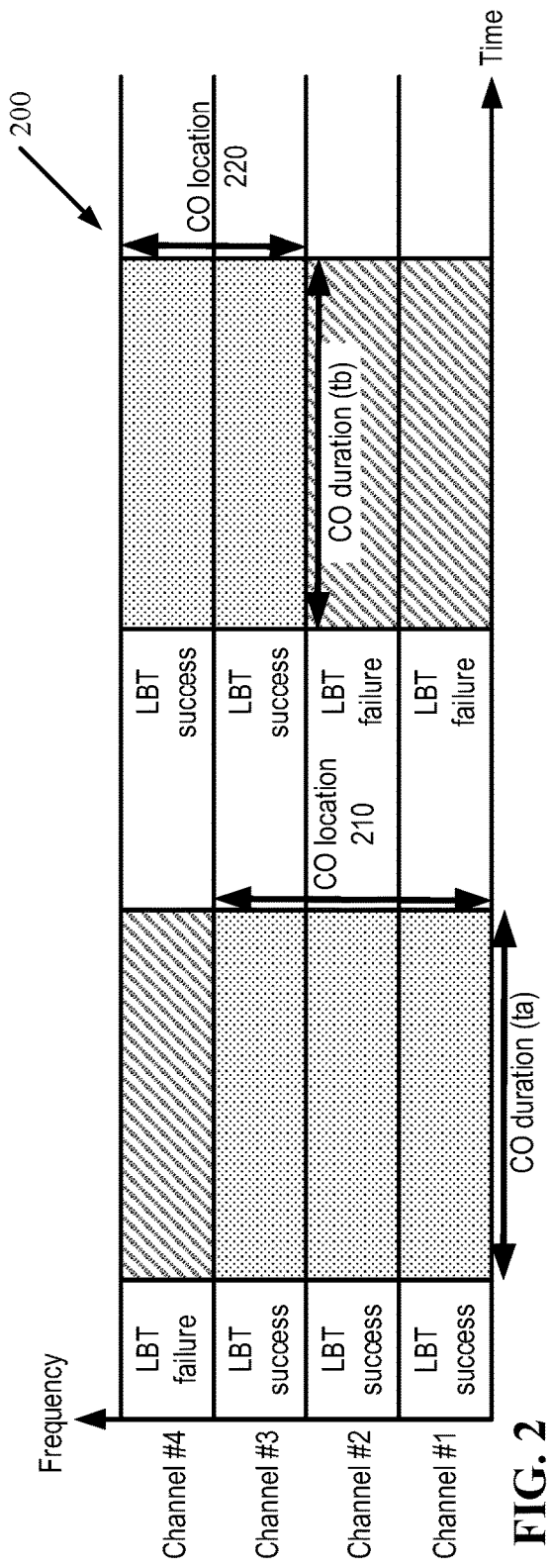
FIG. 2 is a diagram illustrating an example of LBT outcomes in a serving cell according to one embodiment.

FIG. 2 is a diagram 200 illustrating an example of LBT outcomes in a serving cell according to one embodiment. Channels #1, #2, #3 and #4 represent four channels of a serving cell. According to the example, LBT succeeds in the channel occupancy (CO) location 210 of channels #1, #2, and #3 in a CO duration (ta). The example further shows that LBT succeeds in the CO location 220 of channels #3 and #4 in a CO duration (tb). A CO location refers to a frequency location, and a CO duration refers to a time duration. In combination, a CO duration and a CO location indicate the time-and-frequency availability for signal transmission and reception in a serving cell.

Figure 3:
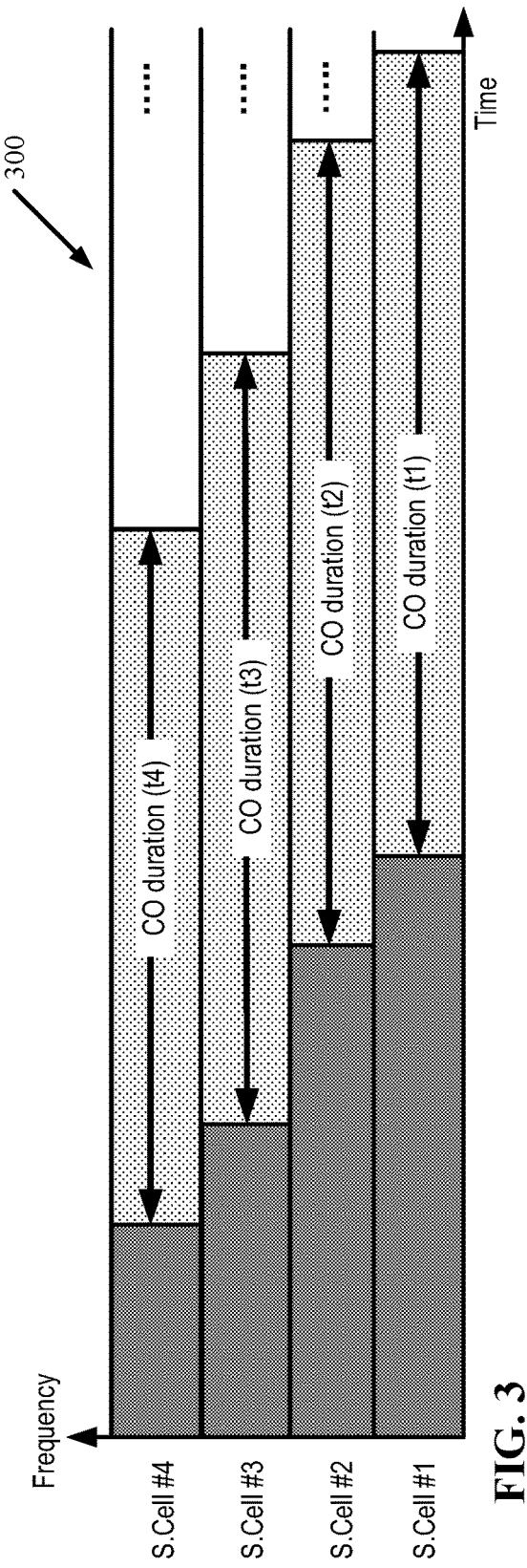
FIG. 3 is a diagram illustrating an example of CO durations in different serving cells according to one embodiment.

FIG. 3 is a diagram 300 illustrating CO durations in different serving cells according to one embodiment. Serving cells (denoted as S.cells) #1, #2, #3, and #4 are configured with respective bandwidth units, where a bandwidth unit may include one or more channels. According to the example, S.cells #1, #2, #3, and #4 acquire CO durations t1, t2, t3, and t4, respectively, where the CO durations have different lengths of time for transmitting traffic of different priority classes. The CO durations for different serving cells may have not only different time lengths, but also different starting and/or ending times.

The indications of channel occupancy in frequency and time domains may be communicated as control information from a base station to one or more UEs in a serving cell. In one embodiment, the control information is the DCI. The time-domain indication of channel occupancy may be provided for each serving cell. In one embodiment, the control information is referred to as the "common control information" when the control information is transmitted in a PDCCH using UE-group common signaling, where the UE-group is composed of one or more UEs identified by the same group ID.

In some embodiments, the control information is cell-specific or group-common to multiple UEs. A group-common (GC)-PDCCH can be used to deliver the control information to a UE group to avoid overhead in signaling to multiple UEs. In some embodiments, the control information may be delivered on a PDCCH which is not limited to a GC PDCCH.

The UEs of a serving cell may utilize the channel occupancy acquired by the base station to send uplink signals. For example, the base station acquires CO duration Tn for a serving cell. However, the base station completes the downlink transmission in time T1, where T1<Tn. The remaining time (Tn−T1) may be used by one or more UEs of the serving cell for uplink transmission. The UEs may transmit uplink signals in a base-station-initiated ("BS-initiated") channel occupancy with a shortened LBT or without any LBT, depending on the length of the remaining time (Tn−T1).

As mentioned before, the LBT process includes the time spent on sensing a channel for availability before transmission. A longer sensing time means a higher failure rate for obtaining a clear channel, because there is a higher probability that another station may transmit signals during the sensing time. When a UE of a serving cell is informed of the BS-initiated channel occupancy in the time domain, the UE may perform an LBT belonging to a category that requires no LBT or a shortened LBT in the time-and-frequency resources that have been acquired for the serving cell. Therefore, the success rate of uplink channel access for the UE can be increased.

In one embodiment, an RRC configuration provides time-and-frequency resources for locating and monitoring the PDCCH. UE may locate the PDCCH based on the information of a control resource set (CORESET) and a search space set. A CORESET is a set of time-and-frequency resources for carrying the PDCCH. A CORESET may be specifically configured to a UE or shared by multiple UEs. A UE performs blind decoding throughout one or more search spaces in the CORESET to locate the UE-specific PDCCH or GC-PDCCH that carries the DCI. The DCI transmitted in a GC-PDCCH is also referred to as the GC-DCI, which has the DCI format 2_0.

Each CO duration has a starting time and an ending time. The CO duration starts when the DCI for the serving cell is transmitted. In some scenarios, one or both of the starting time and the ending time may coincide with slot boundaries in the time domain. In some other scenarios, one or both of the starting time and the ending time may be misaligned with the slot boundaries.

Figure 4:
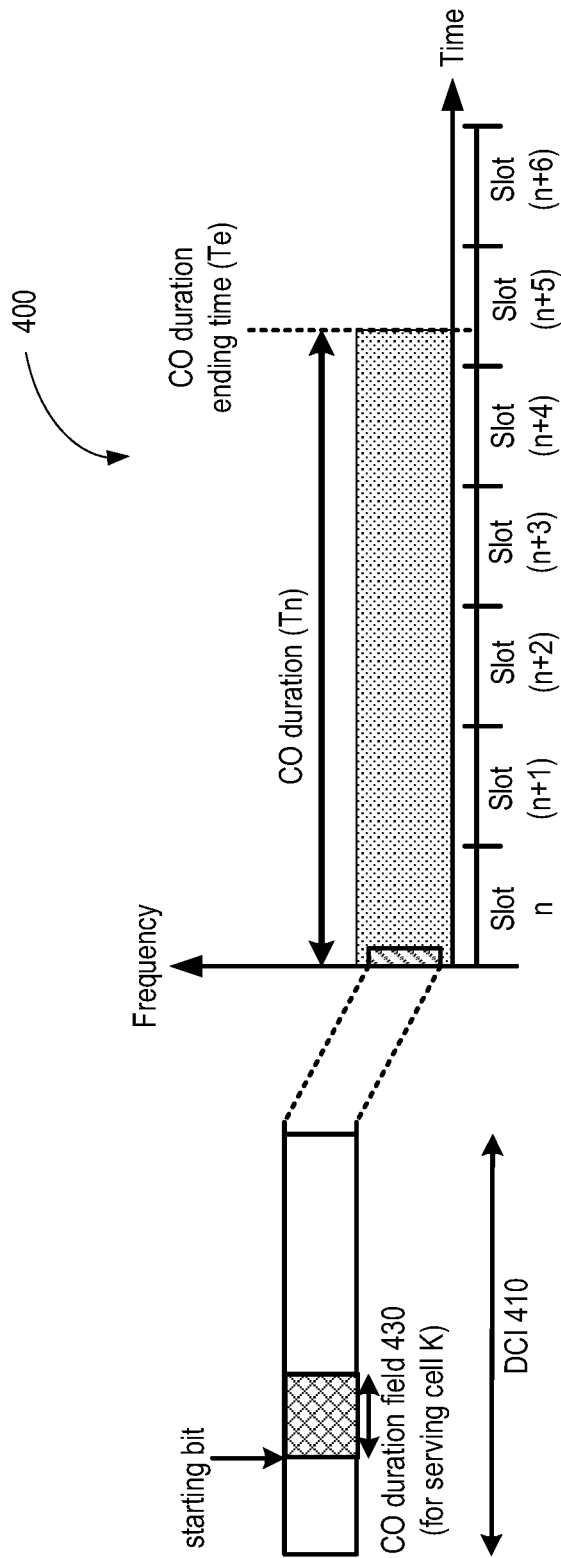
FIG. 4 is a diagram illustrating a CO duration field in downlink control information (DCI) according to an embodiment.

FIG. 4 is a diagram 400 illustrating the time-and-frequency resources configured for a serving cell (e.g., cell K)

according to an embodiment. According to the outcomes of LBT, the base station acquires one or more channel with CO duration Tn for cell K. The base station can inform the UEs of per-cell CO information, such as channel availability and the corresponding CO duration via a DCI 410 carried in a PDCCH. In one embodiment, the PDCCH may be a GC PDCCH.

As an example, the DCI 410 is received by the UE in the first slot (e.g., slot n) of the CO duration Tn. In one embodiment, the DCI 410 includes a CO duration field 430 for cell K. The CO duration field 430 may specify the length or the ending time of the CO duration Tn for cell K. The CO duration field 430 provides a symbol-level granularity for the CO duration. In this example, the CO duration is between 5 and 6 slots in length; e.g., 5 slots and 4 symbols. The CO duration field 430 may specify the CO duration Tn by the total number of symbols in Tn, or by the ending symbol of Tn. The CO duration Tn may start from the symbol in which the DCI 420 is received. In some scenarios, one or both of the starting symbol and the ending symbol of a CO duration are not aligned with a slot boundary.

In one embodiment, a UE may obtain information of the CO duration field 430 from the network via an RRC configuration. For example, parameters of the RRC configuration may include the position (e.g., the starting bit) of the CO duration field 430, and the serving cell ID identifying the serving cell for which the CO duration field 430 is applicable.

In one embodiment, a serving cell may be configured with multiple channels, each of which can be accessed via a respective LBT process. Some of these channels may be available (with a successful LBT outcome) and some may be unavailable (with a failed LBT outcome). In one embodiment, the CO duration field 430 may specify a CO duration for serving cell K, and a per-channel occupancy indicator for serving cell K to indicate the availability of each channel in the serving cell. As such, a receiving UE can be informed of which channel is available (i.e., not occupied) for the CO duration specified in the CO duration field 430.

In one embodiment, the CO duration field 430 may specify the CO durations for multiple serving cells. As described in connection with the example in FIG. 3, the CO durations for different serving cells may be different from one another.

A base station can inform UEs of control information related to the slot format. The control information may include a time-domain channel occupancy structure (e.g., slot format index information (SFI)-index) which indicates transmission directions (uplink, downlink, or flexible) during the channel occupancy. In one embodiment, the DCI (e.g., the DCI 410 in FIG. 4) contains the SFI-index.

Figure 5:
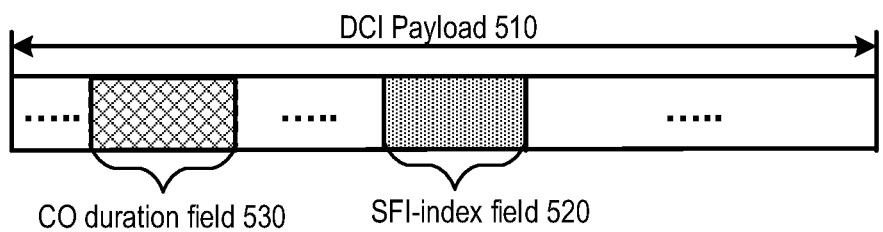
FIG. 5 is a diagram illustrating an example of DCI payload containing a CO duration field and a slot format information (SFI)-index field according to one embodiment.

FIG. 5 is a diagram illustrating an example of time-domain CO indication in a DCI payload 510 according to one embodiment. The DCI payload 510 may be an example of the DCI 410 in FIG. 4. The DCI payload 510 includes an SFI-index field 520 indicating slot format related information for a serving cell. For example, the SFI-index field may include an SFI index, which points to a list of (N+1) entry indices, where N is a non-negative integer. Each entry index points to a slot format defined in the specification promulgated by the 3GPP. For each symbol in a slot, the slot format specifies whether the symbol is designated for uplink, downlink, flexible, or another use. The mapping between an entry index and a corresponding slot format may be stored in the UE memory. In one embodiment, the SFI-index field may contain one or more SFI indices for one or more corresponding serving cells.

Figure 6:
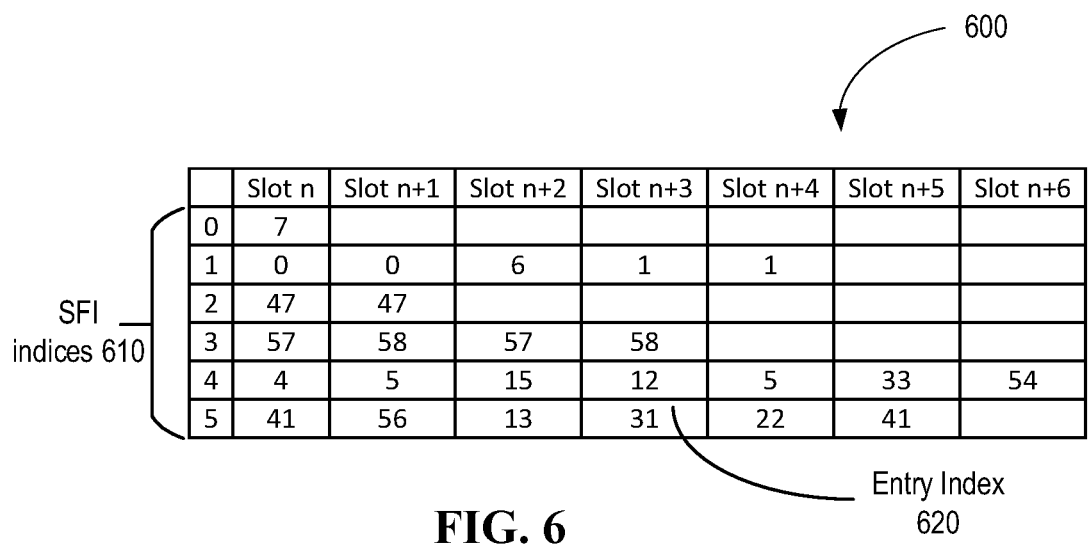
FIG. 6 is a diagram illustrating an example of an SFI index table according to one embodiment.

FIG. 6 is a diagram illustrating an SFI-index table 600 according to one embodiment. Each UE may be configured by higher layer signaling (e.g., RRC) a table such as the SFI-index table 600 containing multiple SFI indices 610, with each SFI index associated with (i.e., corresponding to or pointing to) a list of (N+1) entry indices 620. The (N+1) entry indices 620 specify slot formats for slot n, slot (n+1), ..., slot (n+N), where slot n is the slot in which UE detects a group-common DCI carrying the SFI-index field 520 (FIG. 5). In the example of FIG. 5, the SFI-index table 600 includes SFI indices 0-5, with each SFI index corresponding to a row of entry indices 620. For example, SFI index 0 corresponds to the entry index 7 for slot n, and SFI index 3 corresponds to the entry indices 57, 58, 57, and 58 for slot n, slot (n+1), slot (n+2), and slot (n+3), respectively. As mentioned before, each entry index corresponds to a pre-defined slot format.

Thus, the SFI-index field 520 in FIG. 5 may be used by the UE to obtain the number of entry indices 620, from which the UE can infer the CO duration in terms of the number of slots; e.g., 5 entry indices (N+1=5) indicate 5 slots in the CO duration; e.g., if the SFI-index field 520 specifies an SFI index=1, which has 5 entry indices, it means that the CO duration is 5 slots long. Thus, the SFI-index field 520 provides an indication of CO duration at a slot-level granularity. However, the ending time of CO duration may not align with the slot boundary. Using the SFI index to obtain or infer CO duration may render the symbols outside of the last full slot unusable.

Referring back to the example in FIG. 5, in one embodiment, the DCI payload 510 includes a CO duration field 530 in addition to the SFI-index field 520. The CO duration field 530 provides an indication of CO duration at symbol-level granularity, such as an indication of the number of symbols in the CO duration or the ending symbol of the CO duration. The CO duration field 530 may be an example of the CO duration field 430 in FIG. 4.

In one embodiment, a base station transmits the DCI 510 configured to include the CO duration field 530. The DCI may be transmitted to the UEs in a serving cell in a PDCCH. In one embodiment, the PDCCH may be a GC-PDCCH. However, if the CO duration field 530 is not configured in a DCI transmitted on the GC-PDCCH, the CO duration of a channel occupancy acquired by a serving cell may be determined according to the SFI-index field 520 in the DCI 510.

In one embodiment, the locations of both the SFI-index field 520 and the CO duration field 530 in the DCI payload 510 are configurable via higher layer signaling (e.g., RRC). The base station can determine whether to include the CO duration field 530 in the DCI payload 510.

Figure 7:
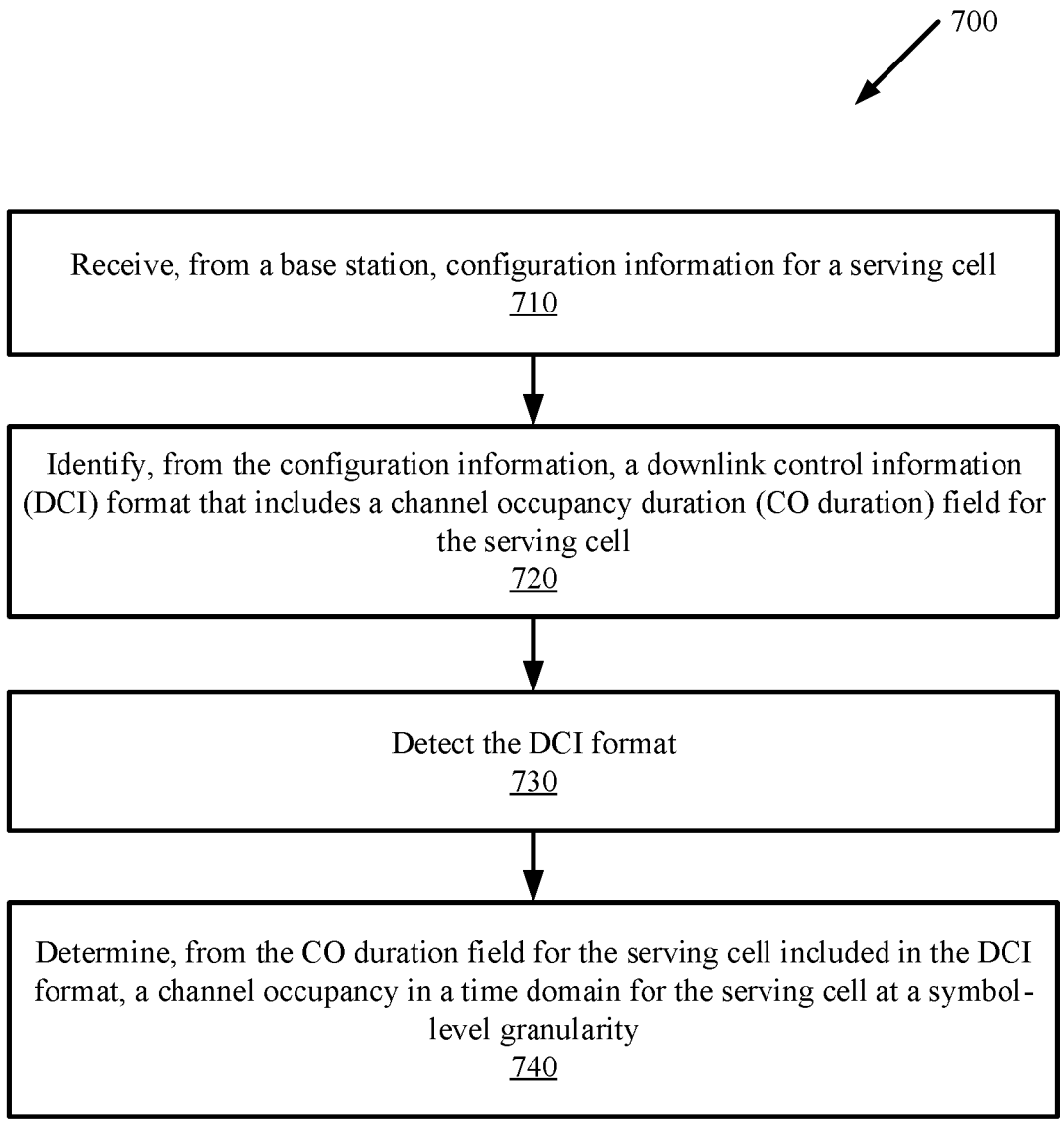
FIG. 7 is a flow diagram illustrating a method for a UE to receive an indication of channel occupancy in the time domain according to one embodiment.

FIG. 7 is a flow diagram illustrating a method 700 performed by a UE in a wireless network according to one embodiment. The method 700 starts at step 710 when the UE receives configuration information for a serving cell from a base station. From the configuration information, the UE at step 720 identifies a DCI format that includes a CO duration field for the serving cell. The UE at step 730 detects the DCI format. In one embodiment, the UE may detect the DCI format from a DCI receive in a GC-PDCCH. From the CO duration field for the serving cell included in the DCI format, the UE at step 740 determines a channel occupancy in a time domain for the serving cell at a symbol-level granularity.

In one embodiment, in response to a determination from the configuration information that the DCI format does not include the CO duration field, the UE determines, from an SFI-index field for the serving cell included in the DCI format, the channel occupancy in the time domain for the serving cell at a slot-level granularity. From the configuration information, the UE may first identifies that the DCI format includes an SFI-index field for the serving cell. Then the UE detects the DCI format from the base station. From the SFI-index field for the serving cell included in the DCI format, the UE determines the channel occupancy in the time domain for the serving cell at a slot-level granularity. In one embodiment, the CO duration field specifies a time-domain ending symbol position of channel occupancy. Alternatively, the CO duration field specifies a duration of channel occupancy in symbols (e.g., the total number of symbols in the CO duration). The CO duration field may specify one or more CO durations for corresponding one or more serving cells. The CO duration starts from a slot in which the UE detects the DCI format.

Figure 8:
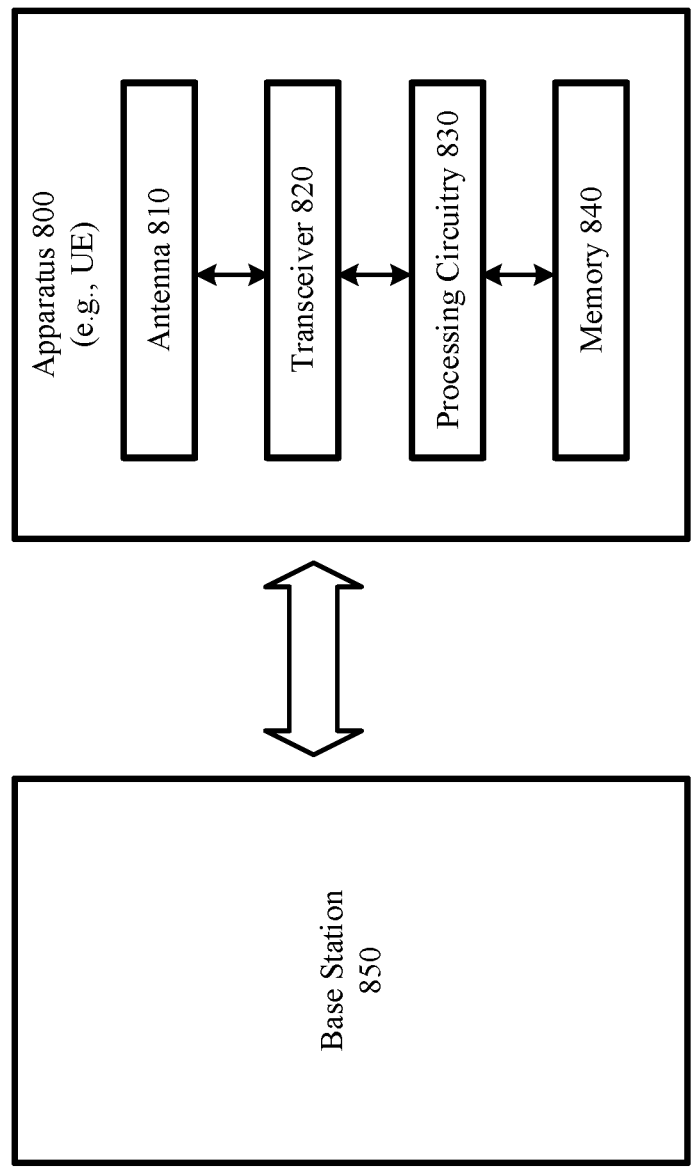
FIG. 8 is a block diagram illustrating an apparatus that performs wireless communication according to one embodiment.

FIG. 8 is a block diagram illustrating elements of an apparatus 800 performing wireless communication with a base station 850 according to one embodiment. In one embodiment, the apparatus 800 may be a UE and the base station 850 may be a gNb or the like, both of which may operate in a wireless network, such as the wireless network 100 in FIG. 1. In one embodiment, the apparatus 800 may be any of the UEs 150 in FIG. 1.

As shown, the apparatus 800 may include an antenna 810, and a transceiver circuit (also referred to as a transceiver 820) including a transmitter and a receiver configured to provide radio communications with another station in a radio access network, including communication in an unlicensed spectrum. The transmitter and the receiver may include filters in the digital front end for each cluster, and each filter can be enabled to pass signals and disabled to block signals. The apparatus 800 may also include processing circuitry 830 which may include one or more control processors, signal processors, central processing units, cores, and/or processor cores. The apparatus 800 may also include a memory circuit (also referred to as memory 840) coupled to the processing circuitry 830. The apparatus 800 may also include an interface (such as a user interface). The apparatus 800 may be incorporated into a wireless system, a station, a terminal, a device, an appliance, a machine, and IoT operable to perform wireless communication in an unlicensed spectrum, such as a 5G NR-U network. It is understood the embodiment of FIG. 8 is simplified for illustration purposes. Additional hardware components may be included.

In one embodiment, the apparatus 800 may store and transmit (internally and/or with other electronic devices over a network) code (composed of software instructions) and data using computer-readable media, such as non-transitory tangible computer-readable media (e.g., computer-readable storage media such as magnetic disks; optical disks; read-only memory; flash memory devices) and transitory computer-readable transmission media (e.g., electrical, optical, acoustical or other forms of propagated signals). For example, the memory 840 may include a non-transitory computer-readable storage medium that stores computer-readable program code. The code, when executed by the processors, causes the processors to perform operations according to embodiments disclosed herein, such as the method disclosed in FIG. 7.

Although the apparatus 800 is used in this disclosure as an example, it is understood that the methodology described herein is applicable to any computing and/or communication device capable of performing wireless communications.

The operations of the flow diagram of FIG. 7 has been described with reference to the exemplary embodiments of FIGS. 1 and 8. However, it should be understood that the operations of the flow diagram of FIG. 7 can be performed by embodiments of the invention other than the embodiments of FIGS. 1 and 8, and the embodiments of FIGS. 1 and 8 can perform operations different than those discussed with reference to the flow diagram. While the flow diagram of FIG. 7 shows a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits, or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method performed by a user equipment (UE) in a wireless network, comprising:
   receiving, from a base station, downlink control information (DCI);
   determining, from configuration information, whether or not a DCI format of the DCI includes a channel occupancy duration (CO duration) field for a serving cell and a slot format information (SFI)-index field; and
   in response to a determination from the configuration information that the DCI format includes the CO duration field, identifying, from the CO duration field for the serving cell included in the DCI format, a channel occupancy in a time domain for the serving cell at a symbol-level granularity.

2. The method of claim 1, further comprising:
   in response to a determination from the configuration information that the DCI format does not include the CO duration field, identifying, from the SFI-index field for the serving cell included in the DCI format, the channel occupancy in the time domain for the serving cell at a slot-level granularity.

3. The method of claim 1, wherein the CO duration field specifies a time-domain ending symbol position of the channel occupancy.

4. The method of claim 1, wherein the CO duration field specifies a duration of the channel occupancy in symbols.

5. The method of claim 1, further comprising:
   receiving, from the base station, higher layer signaling indicating a starting bit of the CO duration field in the DCI format.

6. The method of claim 1, wherein the CO duration field specifies one or more CO durations for corresponding one or more serving cells.

7. The method of claim 1, wherein the CO duration starts from a slot in which the UE detects the DCI format.

8. The method of claim 1, wherein the DCI format includes both the CO duration field and the SFI-index field.

9. The method of claim 1, wherein the DCI format is detected in a group-common physical downlink control channel (GC-PDCCH).

10. The method of claim 1, wherein the wireless network is a 5G NR-U network.

11. An apparatus for wireless communication, the apparatus being a user equipment (UE), comprising:
- a memory; and
- processing circuitry coupled to the memory and operative to:
  - receive, from a base station, downlink control information (DCI);
  - determine, from configuration information, whether or not a DCI format of the DCI includes a channel occupancy duration (CO duration) field for the serving cell and a slot format information (SFI)-index field; and
  - in response to a determination from the configuration information that the DCI format includes the CO duration field, identify, from the CO duration field for the serving cell included in the DCI format, a channel occupancy in a time domain for the serving cell at a symbol-level granularity.

12. The apparatus of claim 11, wherein the processing circuitry is further operative to:
- in response to a determination from the configuration information that the DCI format does not include the CO duration field, identify, from the SFI-index field for the serving cell included in the DCI format, the channel occupancy in the time domain for the serving cell at a slot-level granularity.

13. The apparatus of claim 11, wherein the CO duration field specifies a time-domain ending symbol position of the channel occupancy.

14. The apparatus of claim 11, wherein the CO duration field specifies a duration of the channel occupancy in symbols.

15. The apparatus of claim 11, wherein the processing circuitry is further operative to:
- receive, from the base station, higher layer signaling indicating a starting bit of the CO duration field in the DCI format.

16. The apparatus of claim 11, wherein the CO duration field specifies one or more CO durations for corresponding one or more serving cells.

17. The apparatus of claim 11, wherein the CO duration starts from a slot in which the UE detects the DCI format.

18. The apparatus of claim 11, wherein the DCI format includes both the CO duration field and the SFI-index field.

19. The apparatus of claim 11, wherein the DCI format is detected in a group-common physical downlink control channel (GC-PDCCH).

20. The apparatus of claim 11, wherein the wireless network is a 5G NR-U network.

* * * * *